(12) United States Patent
Skory et al.

(10) Patent No.: US 9,199,155 B2
(45) Date of Patent: Dec. 1, 2015

(54) MORPHEME-LEVEL PREDICTIVE GRAPHICAL KEYBOARD

(71) Applicant: Google Inc., Mountain View, CA (US)

(72) Inventors: Adam Travis Skory, London (GB); Richard Zarek Cohen, London (GB)

(73) Assignee: Google Inc., Mountain View, CA (US)

( * ) Notice: Subject to any disclaimer, the term of this patent is extended or adjusted under 35 U.S.C. 154(b) by 229 days.

(21) Appl. No.: 13/897,118

(22) Filed: May 17, 2013

(65) Prior Publication Data

US 2014/0278368 A1 Sep. 18, 2014

Related U.S. Application Data

(60) Provisional application No. 61/785,578, filed on Mar. 14, 2013.

(51) Int. Cl.
*G06F 17/27* (2006.01)
*G06F 17/20* (2006.01)
*A63B 71/00* (2006.01)
*G06F 17/22* (2006.01)
*G06F 3/023* (2006.01)
*G06F 3/0488* (2013.01)

(52) U.S. Cl.
CPC .......... *A63B 71/0036* (2013.01); *G06F 3/0237* (2013.01); *G06F 3/04886* (2013.01); *G06F 17/22* (2013.01); *G06F 17/276* (2013.01); *G06F 17/2755* (2013.01)

(58) Field of Classification Search
None
See application file for complete search history.

(56) References Cited

U.S. PATENT DOCUMENTS

| 7,886,233 | B2 * | 2/2011 | Rainisto et al. | 715/773 |
| 8,311,796 | B2 * | 11/2012 | Kristensson et al. | 704/1 |
| 8,356,041 | B2 * | 1/2013 | Paek et al. | 707/756 |
| 8,543,384 | B2 * | 9/2013 | Kristensson et al. | 704/10 |
| 8,712,755 | B2 * | 4/2014 | Kristensson et al. | 704/1 |

(Continued)

FOREIGN PATENT DOCUMENTS

| EP | 0 524 385 A2 | 1/1993 |
| EP | 0 524 385 A3 | 1/1993 |

OTHER PUBLICATIONS

Vertanen et al., "Parakeet: A Continuous Speech Recognition System for Mobile Touch-Screen Devices," Proceedings of the 13th International Conference on Intelligent User Interfaces, IUI '09, pp. 237-246.

(Continued)

*Primary Examiner* — Satwant Singh
(74) *Attorney, Agent, or Firm* — Shumaker & Sieffert, P.A.

(57) ABSTRACT

In one example, a method includes determining, by a computing device and based at least in part on an initial character string, one or more candidate morpheme sequences, wherein each of the candidate morpheme sequences includes the initial character string and one or more candidate morphemes. The method further includes outputting, for display, the one or more candidate morpheme sequences. The method further includes receiving an indication of a user input detected at a presence-sensitive input device. The method further includes selecting, based on the indication of the user input, at least one of the candidate morphemes from one of the candidate morpheme sequences to define a selected morpheme sequence that includes the initial character string and the selected candidate morpheme from the one of the candidate morpheme sequences. The method further includes outputting, for display, the selected morpheme sequence.

27 Claims, 6 Drawing Sheets

(56) References Cited

U.S. PATENT DOCUMENTS

| | | | |
|---|---|---|---|
| 8,713,433 B1* | 4/2014 | Ouyang et al. | 715/261 |
| 8,768,950 B2* | 7/2014 | Nakano | 707/767 |
| 8,832,589 B2* | 9/2014 | Zhai et al. | 715/783 |
| 9,026,426 B2* | 5/2015 | Wu | G06F 3/018 704/1 |
| 2006/0265648 A1 | 11/2006 | Rainisto | |
| 2007/0094024 A1* | 4/2007 | Kristensson et al. | 704/252 |
| 2011/0071818 A1* | 3/2011 | Jiang | G06F 3/0236 704/8 |
| 2012/0016658 A1* | 1/2012 | Wu et al. | 704/3 |
| 2014/0188460 A1* | 7/2014 | Ouyang et al. | 704/9 |
| 2014/0372880 A1* | 12/2014 | Zhai et al. | 715/259 |

OTHER PUBLICATIONS

Garay-Vitoria et al., "Modelling Text Prediction Systems in Low- and High-Inflected Languages," Computer Speech and Language, Elsevier, London, GB, vol. 24, No. 2, Apr. 1, 2010, pp. 117-135.

International Search Report and Written Opinion, International Application No. PCT/US2014/019784, mailed Sep. 10, 2014, 12 pages.

International Preliminary Report on Patentability from International Application No. PCT/US2014/01784, mailed Sep. 24, 2015, 9 pages.

* cited by examiner

MORPHEME-LEVEL PREDICTIVE GRAPHICAL KEYBOARD

RELATED APPLICATION

This application claims the benefit of U.S. Provisional Application No. 61/785,578, filed Mar. 14, 2013, the entire content of which is hereby incorporated by reference.

BACKGROUND

Some computing devices (e.g., mobile phones, tablet computers, etc.) may provide a graphical keyboard as part of a graphical user interface for composing text using a presence-sensitive input device (e.g., a presence-sensitive display, such as touchscreen) included in or operatively coupled to the computing device. The graphical keyboard may enable a user of the computing device to enter text (e.g., an e-mail, a text message, a document, etc.). For instance, a presence-sensitive display operatively coupled to a computing device may output a graphical (or "soft") keyboard that enables the user to enter data by indicating (e.g., by tapping or swiping) keys displayed at the presence-sensitive display.

In some cases, a computing device may be configured to predict strings of text, such as completed words, based on one or more characters input using the graphical keyboard. In some implementations, the computing device references one or more word libraries and/or vocabularies (such as one or more dictionaries) to determine one or more candidate words based on the input characters. The computing device may output, for display, the one or more candidate words and may update the candidate words in response to receiving additional input characters. In some instances when a user is entering a long word, such as a long word that includes more than one morpheme (e.g., constituent element) or that includes one of a variety of different potential inflections, the computing device may determine several candidate words based on the input characters, even after a relatively large number of input characters are received by the computing device. In such instances, inputting the desired words may be relatively time-consuming and may require several user inputs.

SUMMARY

In one example, a method includes determining, by a computing device and based at least in part on an initial character string, one or more candidate morpheme sequences, wherein each of the candidate morpheme sequences includes the initial character string and one or more candidate morphemes. The method further includes outputting, by the computing device and for display, the one or more candidate morpheme sequences. The method further includes receiving, by the computing device, an indication of a user input detected at a presence-sensitive input device. The method further includes selecting, by the computing device and based on the indication of the user input, at least one of the candidate morphemes from one of the candidate morpheme sequences to define a selected morpheme sequence that includes the initial character string and the selected candidate morpheme from the one of the candidate morpheme sequences. The method further includes outputting, by the computing device and for display, the selected morpheme sequence.

In another example, a computing system includes at least one processor. The at least one processor is configured to determine, based at least in part on an initial character string, one or more candidate morpheme sequences, wherein each of the candidate morpheme sequences includes the initial character string and one or more candidate morphemes. The at least one processor is further configured to output, for display, the one or more candidate morpheme sequences. The at least one processor is further configured to receive an indication of a user input detected at a presence-sensitive input device. The at least one processor is further configured to select, based on the indication of the user input, at least one of the candidate morphemes from one of the candidate morpheme sequences to define a selected morpheme sequence that includes the initial character string and the selected candidate morpheme from the one of the candidate morpheme sequences. The at least one processor is further configured to output, for display, the selected morpheme sequence.

In another example, a computer-readable storage medium is encoded with instructions executable by at least one processor to determine, based at least in part on an initial character string, one or more candidate morpheme sequences, wherein each of the candidate morpheme sequences includes the initial character string and one or more candidate morphemes. The instructions are further executable by the at least one processor to output, for display, the one or more candidate morpheme sequences. The instructions are further executable by the at least one processor to receive an indication of a user input detected at a presence-sensitive input device. The instructions are further executable by the at least one processor to select, based on the indication of the user input, at least one of the candidate morphemes from one of the candidate morpheme sequences to define a selected morpheme sequence that includes the initial character string and the selected candidate morpheme from the one of the candidate morpheme sequences. The instructions are further executable by the at least one processor to output, for display, the selected morpheme sequence.

The details of one or more embodiments are set forth in the accompanying drawings and the description below. Other features, objects, and advantages will be apparent from the description and drawings, and from the claims.

BRIEF DESCRIPTION OF DRAWINGS

The various described features are not drawn to scale and are drawn in a simplified form in which one or more features relevant to the present application are emphasized. Like reference characters denote like elements throughout the figures and text.

DETAILED DESCRIPTION

Figure 1:
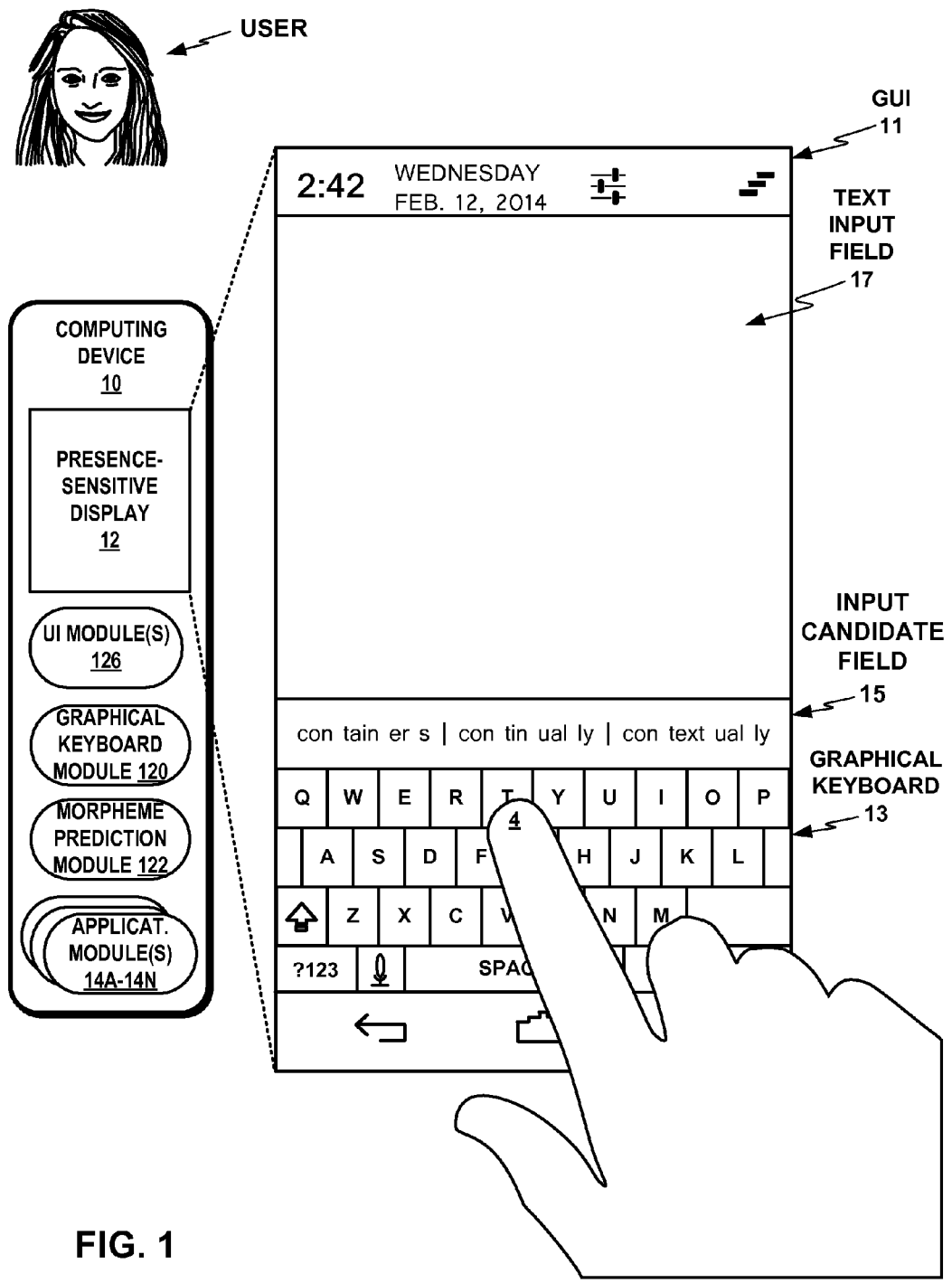
FIG. 1 is a conceptual diagram illustrating an example computing device configured to implement a graphical keyboard with morpheme-level word prediction features, in accordance with illustrative aspects of this disclosure.

In general, this disclosure is directed to techniques for providing morpheme-level word predictions based on user input received at a graphical keyboard. Morpheme-level word predictions can, for example, be based on the morphemes (e.g., constituent elements) of a word, rather than on the entire word itself. In some instances, a computing device applying morpheme-level word prediction techniques can output a particular word after fewer inputs received from a user as compared to a computing device applying word-level word prediction techniques. In examples where a user would like to input a long compound word that includes multiple morphemes, a computing device configured in accordance with morpheme-level word prediction techniques of this disclosure may predict candidate words that are more similar to the desired word after fewer user inputs than one configured with only word-level word prediction techniques.

In various instances, morpheme-level word prediction techniques of this disclosure can enable more fine-grained word predictions than typical word-level word prediction techniques. For example, a computing device configured with typical word-level prediction presents candidate words as entire words and, responsive to receiving a user selection of one of the candidate words, enters the selected candidate word and removes the other candidate words from a candidate word field. In contrast, morpheme-level word prediction techniques of this disclosure can, as one example, enable a computing device to present candidate words with morpheme-level divisions based on an initial set of user input. A candidate word presented with morpheme-level divisions may form a sequence of morphemes. In response to receiving a user input corresponding to a selection of one or more of the morphemes in one of the candidate words, the computing device may present a new set of candidate words based on different morphemes. In some examples, the different morphemes may be appended to the partial morpheme sequence that includes the selected morpheme(s) in one of the candidate words.

In some examples, morpheme-level word prediction techniques of this disclosure may enable a computing device to generate candidate words that include orthographic changes, such as spelling changes between different morpheme combinations, at morpheme boundaries. Techniques of this disclosure may also enable a computing device to distinguish between and present candidate words with different morpheme endings based on an initial character string based on an initial input. Additionally, morpheme-level word prediction techniques can apply optimization algorithms at the level of morphemes in optimizing for selecting and ranking candidate words. A computing device applying an optimization algorithm of this disclosure may optimize at the morpheme level to minimize or otherwise reduce key inputs, which may enable word selection with fewer inputs than optimizing at the word level. A computing device configured to use techniques of this disclosure such as those described above may reduce the number of user inputs required to enter various words as compared to word-level prediction techniques.

FIG. 1 is a conceptual diagram illustrating an example computing device 10 configured to implement a graphical keyboard with morpheme-level word prediction features, in accordance with illustrative aspects of this disclosure. Computing device 10 implementing a graphical keyboard with morpheme-level word prediction features may enable successful word predictions after a lower number of user inputs or a faster user input process compared to traditional word prediction techniques, in some examples.

In the example of FIG. 1, computing device 10 includes a presence-sensitive display 12 with a graphical user interface (GUI) 11 displayed thereon. GUI 11 includes graphical keyboard 13, input candidate field 15, and text input field 17, in this example. Computing device 10 also has executable instructions stored and/or executing thereon, including a graphical keyboard module 120, a morpheme-level word prediction module 122, one or more user interface (UI) modules 126, and any number of additional application modules 14A-14N ("application modules 14"). Graphical keyboard module 120, morpheme-level word prediction module 122, UI modules 126, and additional application modules 14 may each be software applications, application components, or other portions of executable instructions and/or data. Graphical keyboard module 120 and morpheme-level word prediction module 122 may be portions of a single software application, separate applications, application modules, libraries, operating system components, or other components stored on and/or or executing on computing device 10. Any one or more of graphical keyboard module 120, morpheme-level word prediction module 122, UI module 126, and/or additional application modules 14 may include executable instructions and/or data involved in generating outputs that implement GUI 11, the features included in GUI 11, and/or functions described below.

Graphical keyboard module 120 may include instructions for rendering graphical keyboard 13, input candidate field 15, and/or text input field 17 in GUI 11, in some examples. Computing device 10 may thereby be enabled to implement graphical keyboard 13 to receive gesture touch inputs from a user in selecting keys among the graphical keyboard 13. In receiving user inputs to graphical keyboard 13, computing device 10 may detect gesture inputs (e.g., touch-based, motion-based, and/or contactless inputs) at areas of presence-sensitive display 12 that correspond to areas in which different keys of graphical keyboard 13 are displayed. Presence-sensitive display 12 may communicate signals that function as indications of the user inputs to other elements of computing device 10, such as a processor. Computing device 10 may then process the indications of the user gesture inputs and thereby interpret the user inputs into selections of keys of graphical keyboard 13.

As depicted in the example of FIG. 1, computing device 10 may receive indications of an input from a user in response to gesture inputs at graphical keyboard 13. In the example depicted in FIG. 1, computing device 10 may receive input indicative of a gesture input at position 4, within the area of a key for the letter "T" in the graphical keyboard 13. In this example, computing device 10 may have previously received input indicative of gesture inputs within the areas of the keys for the letters "C," "O," and "N," forming an initial character string "con." In this example, position 4 represents an area of graphical keyboard 13 indicated by the user's fourth gesture input (e.g., fourth keystroke, fourth intended key in a swipe gesture input, fourth indicated key in a contactless gesture input, etc.) in the process of entering an intended word. The gesture input at position 4 may therefore be an intermediate part of a sequence of gesture inputs received by computing device 10, including the previous gesture inputs indicating areas of graphical keyboard 13. Computing device 10 may make use of morpheme-level prediction features described herein to generate outputs based on the initial character string input. Computing device 10 may continue to make use of morpheme-level prediction features to generate outputs in responding to additional gesture inputs to determine a complete word based on user inputs, as further discussed below.

In some examples, computing device 10 may detect a user's gesture inputs intersecting the areas of various keys within graphical keyboard 13. In other examples, computing device 10 may apply spatial models to position information associated with the user's gesture to select a set of one or more keys of graphical keyboard 13, and the gesture need not intersect each of the selected keys. For example, computing device 10 may process the gesture inputs using graphical keyboard interpretation tools, such as a comparison of gesture input positions with areas of coincident and adjacent keys, a model of typical user motions in entering gesture inputs, a language model, and the like. Computing device 10 may determine one or more candidate characters, initial character strings, and/or complete words in response to the gesture inputs. In this example, computing device 10 also outputs graphical representations of one or more determined candidate morpheme sequences in input candidate field 15, and may receive user gesture inputs selecting a morpheme from one of the candidate morpheme sequences in input candidate field 15.

After computing device 10 has received indications of user inputs and determined an initial character string "cont," computing device 10 may determine a set of candidate morpheme sequences that begin with this initial character string as their initial string of text. As shown in FIG. 1, computing device 10 may select and output at input candidate field 15 the candidate morpheme sequences "containers," "continually," and "contextually," for example. In this example, each of these candidate morpheme sequences forms a complete word. Moreover, in this example, computing device 10 outputs the candidate morpheme sequences with spacings between the adjacent morphemes in each of the candidate morpheme sequences, to serve as visual indicators of the separation between the adjacent morphemes. In this way, computing device 10 displays the candidate morpheme sequences including inter-morpheme spacings as "con tain er s," "con tin ual ly," and "con text ual ly." Thus, even though each of these candidate morpheme sequences forms a complete word in this example, they are each presented as a sequence of morphemes, and each individual morpheme within each sequence of morphemes may be individually selectable through a subsequent user input. This separate presentation of the individual morphemes may facilitate user inputs to select one of the individual morphemes in one of the candidate morpheme sequences, as further described below.

Computing device 10 may initially determine a larger number of candidate morpheme sequences, and then narrow down a field of initially determined candidate morpheme sequences to a smaller number of candidates to output in input candidate field 15. For example, computing device 10 may determine the three candidate morpheme sequences displayed in the example of FIG. 1 to be the three most likely candidate morpheme sequences, or the three candidate morpheme sequences most likely to yield a complete word as ultimately selected by a user. Computing device 10 may, for example, use an optimization algorithm to determine or rank a smaller subset of most likely candidate morpheme sequences to output for display to the user. Computing device 10 may also output a larger subset of likely candidate morpheme sequences in an expanded menu of candidate morpheme sequences, in response to an indication of a user input for selecting to open the expanded menu. For example, computing device 10 may output a selectable user interface element, such as a toggle, for accessing the expanded list of the candidate morpheme sequences. Computing device 10 may then, in response to receiving an indication of a user input to select the selectable user interface element, output the expanded list of the candidate morpheme sequences. Computing device 10 may in this way enable a user to select from a larger range of candidate morpheme sequences.

In an illustrative example corresponding to the depiction in FIG. 1, computing device 10 outputs GUI 11 for display at presence-sensitive display 12, such that GUI 11 includes graphical keyboard 13. Graphical keyboard 13 includes a plurality of keys, wherein each key in the group of keys is associated with a respective, different region of presence-sensitive display 12. Computing device 10 receives an indication of a first user input detected at the presence-sensitive display 12. Computing device 10 then selects, based on the indication of the first user input, a sequence of keys from the plurality of keys, and determines, based at least in part on the sequence of keys, an initial character string, e.g., the initial character string "cont" in the example of FIG. 1. Computing device 10 may then determine, based at least in part on the candidate initial character string, one or more candidate morpheme sequences, e.g., "containers," "continually," and "contextually" as illustratively shown in input candidate field 15 in FIG. 1.

Computing device 10 may determine the candidate morpheme sequences such that each of the candidate morpheme sequences includes the initial character string, "cont," and one or more candidate morphemes. A candidate morpheme may be entirely subsequent to the initial character string in the candidate morpheme sequence, or may include one or more characters in the initial character string, which is the case in the example of FIG. 1. In this case, the second morpheme in each of the candidate morpheme sequences begins with the letter "t", the last letter in the initial character string.

Computing device 10 may output each of the candidate morpheme sequences such that visual divisions or other visual indicators appear between each of the morphemes in each of the candidate morpheme sequences, as shown in FIG. 1. The visual indicators may, for example, include outputting the candidate morpheme sequence "containers" with visual divisions or spacings between adjacent morphemes, as "con tain er s"; outputting the candidate morpheme sequence "continually" with visual divisions or spacings between adjacent morphemes, as "con tin uall y"; and outputting the candidate morpheme sequence "contextually" with visual divisions or spacings between adjacent morphemes, as "con text ual ly". Computing device 10 enables the user to enter a gesture input to select any one of these morphemes in any one of these candidate morpheme sequences, in this example. Computing device 10 may then receive an indication of a user gesture input (e.g., a tab, a swipe, a contactless motion) detected at presence-sensitive display 12 with a position corresponding to any of the individual morphemes in the candidate morpheme sequences output in input candidate field 15. Computing device 10 may then select any one of the individual morphemes based on the indications of the user inputs. Computing device 10 may subsequently receive indications of additional user inputs detected at presence-sensitive display 12 and perform additional actions, as described below with reference to the subsequent figures.

Computing device 10 may apply other forms of visual indicators between adjacent morphemes in other examples. For example, computing device 10 may apply dividing lines between the adjacent morphemes, contrasting coloration of the backgrounds of the adjacent morphemes, or contrasting coloration of the text of the adjacent morphemes.

Once the user has finished selecting a candidate morpheme sequence defining a complete word within input candidate field 15, computing device 10 may then receive an input indicating acceptance of the candidate morpheme sequence as the selected word (or any selected character string). Computing device 10 may, in response, output the selected word, such as by outputting the selected word at text input field 17 of GUI 11, outputting the selected word to a text input field of an application (e.g., an email application, a text messaging application, a text-to-speech application, etc.), or otherwise outputting the selected word. Computing device 10 may also be configured to process various other gesture touch inputs in accordance with morpheme-level word prediction features as described herein. Some additional examples of computing device 10 processing gesture touch inputs in accordance with morpheme-level word prediction are described below with reference to FIGS. 3 and 4.

As used herein, a gesture input to select one or more keys in graphical keyboard 13 or to select a morpheme or a morpheme sequence in input candidate field 15 may include any gesture a user may make such that an input device is capable of detecting the gesture and communicating an indication of the gesture to a computing device. The input device may include a touchscreen or other presence-sensitive display (e.g., presence-sensitive display 12 of FIG. 1), an acoustic sensor, a video camera sensitive to visible, infrared, or other wavelengths of electromagnetic radiation, or other type of sensing device, any of which may form a presence-sensitive display or a portion thereof, e.g., a presence-sensitive input device for a presence-sensitive display. The input device may communicate the indication of the gesture in any of various forms of encoded data. The computing device that receives the indication of the gesture from the input device may be an entire device such as computing device 10, or a component of a device such as a set of processors or an individual processor that may be local to the input device, or within an integral device body with the input device, or separate or remote from the input device, in various examples. A computing device may detect an input in that an input device is physically influenced by and detects the input and communicates an indication of the input to the computing device, for example.

Computing device 10 in various examples may be a smartphone, a tablet computing device, a laptop or desktop computer, a computing device in a wearable form factor such as a wristwatch or glasses computing device, or other type of computing device. Computing device 10 includes a presence-sensitive display 12 in this example. Computing device 10 outputs GUI 11 which may incorporate outputs from applications executing on computing device 10, potentially including from graphical keyboard module 120 and/or morpheme-level word prediction module 122, for display at presence-sensitive display 12. Additional applications or application processes may also be executing on computing device 10 without corresponding GUI's. Additional details of example computing devices are described in further detail below with respect to subsequent figures, including the example of FIG. 2.

Figure 2:
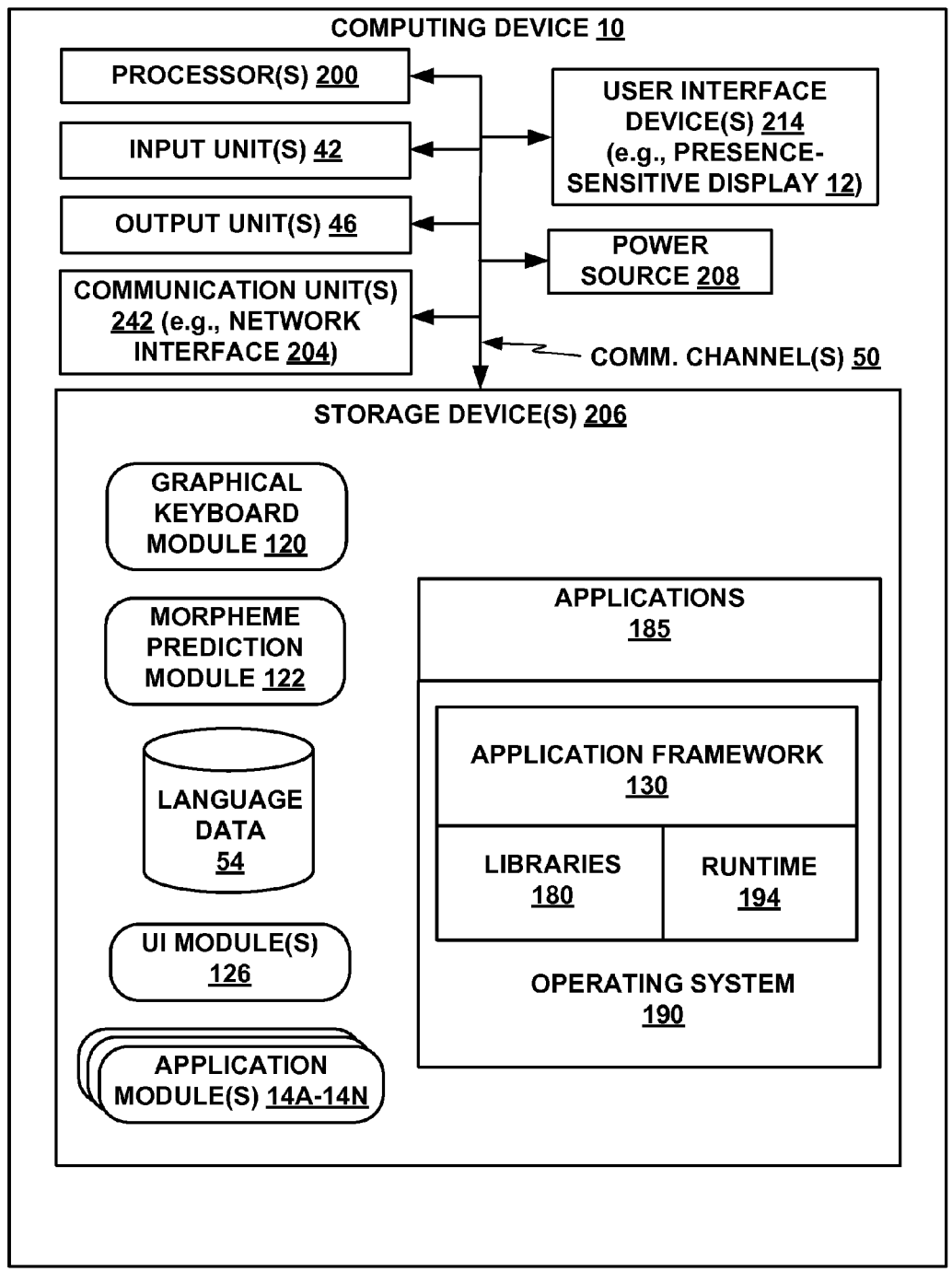
FIG. 2 is a block diagram of one example of the computing device shown in FIG. 1 configured to implement a graphical keyboard with morpheme-level word prediction features, in accordance with illustrative aspects of this disclosure.

FIG. 2 is a schematic diagram of one example of the computing device 10 shown in FIG. 1 configured to implement morpheme-level word prediction techniques, in accordance with an illustrative example of this disclosure. Computing device 10 may have stored thereon a graphical keyboard module 120 and/or a morpheme-level word prediction module 122. Graphical keyboard module 120 and/or morpheme-level word prediction module 122 may be stored on one or more storage devices 206, and may be or may include any of various components in a software arrangement in computing device 10, in various examples. Graphical keyboard module 120 and/or morpheme-level word prediction module 122 of FIG. 2 may correspond to graphical keyboard module 120 and morpheme-level word prediction module 122 as depicted in FIG. 1 and as described above with reference to FIG. 1, including the functions thereof. In the example of FIG. 2, computing device 10 also has stored thereon UI module(s) 126 and additional application modules 14, as also depicted in FIG. 1. UI module(s) 126 and additional application modules 14 also may be or may include any of various components in a software arrangement in computing device 10, in various examples.

Graphical keyboard module 120 and/or morpheme-level word prediction modules 122 as shown in FIG. 2 may perform any one or more functions of this disclosure in different illustrative contexts within a software arrangement executing on computing device 10 in different examples, as further described below. Any of the functions described in this disclosure may be performed by graphical keyboard module 120 and/or morpheme-level word prediction module 122 as depicted in FIG. 2, or by other software modules. As further described below, graphical keyboard module 120 and/or morpheme-level word prediction module 122 may take the form of any element of executable instructions, illustratively including as an application, an application process, a service, a system framework component, a library, or other software element, as a top-level application, as a component of an operating system or middleware, or in any other operational context as executable instructions loaded on, executed by, and/or accessible to computing device 10.

In some instances, the executable components within computing device 10 may be viewed as a software stack in which an application framework 130 executes on top of, or otherwise in interaction with, a runtime environment ("runtime 194") and operating system 190, as illustratively depicted in the example of FIG. 2 and as further described below. Application framework 130, runtime 194, and operating system 190 may also include executable instructions stored on one or more storage devices 206 of computing device 10, as shown in the example of FIG. 2. Computing device 10 may be implemented with other arrangements or architectures of its operating system and/or software stack in other examples that differ from the example shown in FIG. 2. Graphical keyboard module 120 and/or morpheme-level word prediction module 122 may be, may include, or may make use of any of various components of executable instructions included in top-level applications 185, application framework 130, runtime 194, operating system 190, or other system resources of computing device 10.

Computing device 10 of the present disclosure may be implemented in any of a variety of forms, such as a smartphone, a tablet computing device, a laptop or desktop computer, or a wearable computing device, for example. One or more components of example computing device 10 may be optional in different implementations, and various implementations may include additional components beyond those depicted in FIG. 2, or omit one or more of the components depicted in FIG. 2. Although shown in FIGS. 1 and 2 as a stand-alone computing device for purposes of example, computing device 10 may be any component or system that includes one or more processors (e.g., one or more processor(s) 200) or other suitable computing environment for executing software instructions and, for example, need not necessarily include one or more of the elements shown in FIGS. 1 and 2 (e.g., presence-sensitive display 12).

Computing device 10 may include various components illustratively including one or more processor(s) 200, one or more communication unit(s) 242, one or more data storage device(s) 206, power source 208, one or more input unit(s) 42, one or more output unit(s) 46, and/or one or more user interface device(s) 214. One or more communication unit(s) 242 may include a network interface 204, and one or more user interface device(s) 214 may include presence-sensitive display 12, in some examples. Each of components 200, 242, 206, 208, 42, 46, 214, 204, and 12 may be interconnected (physically, communicatively, and/or operatively) by communication channel(s) 50, which may include any components, elements, and/or channels capable of communicating data between components, or in any of a variety of physical and/or communicative connection means for hard-line or wireless inter-component communications. Computing device 10 may also include any type of channels for conveying power from power source 208 to other components. Any of components 200, 242, 206, 208, 42, 46, 214, 204, and 12 as depicted in FIG. 2 may refer to one or more components, in various examples.

User interface device(s) 214 may include one or more input devices and one or more output devices, potentially including devices or systems that function as both an input device and an output device. For example, user interface devices 214 may include presence-sensitive display 12, one or more microphones (not separately depicted), one or more speakers (not separately depicted), one or more cameras that may be configured for video and/or still imaging in visible, infrared, and/or other frequency ranges (not separately depicted), and any other input devices and output devices. Presence-sensitive display 12 and/or other user interface devices 214 may, in some examples, generate signals corresponding to the position or positions of one or more input units, such as a finger or stylus, and potentially including how the position changes over time.

Presence-sensitive display 12 may include one or more input and/or output devices such as a touchscreen or other touch-sensitive display, a proximate-gesture-sensitive display sensitive to gesture inputs that are proximate but not necessarily in contact, a display device and one or more cameras, or other implementations. Presence-sensitive display 12 may include a liquid crystal display (LCD) display screen or display screen that uses another type of graphical output technology. Presence-sensitive display 12 may also include a touchscreen that may include an electrically capacitive layer sensitive to the presence of user contacts or proximate gestures and configured to translate the positions of user contact touch gesture inputs or user proximate gesture inputs, and the motions of gesture inputs as they change position over time, into signals to provide to a driver for the touchscreen or other feature for receiving information on the gesture inputs. Presence-sensitive display 12 may also be implemented as a portion of a computing device having a wearable form factor, such as an eyeglasses or wristwatch form factor, for example. Presence-sensitive display 12 may also be another type of presence-sensitive display in other examples.

In some examples, therefore, presence-sensitive display 12 may detect an object that is at or in contact with the screen of presence-sensitive display 12, and/or is proximate to but not in physical contact with presence-sensitive display 12. Presence-sensitive display 12 may be or include both an input device and an output device that generates one or more signals corresponding to a location selected by a gesture input performed by the user at or near the presence-sensitive screen 12. As one non-limiting example range, presence-sensitive display 12 may detect an object, such as one or more fingers, a stylus, or a pen, that are within approximately two inches or less of the physical screen of presence-sensitive display 12. Presence-sensitive display 12 may determine a location (e.g., an (x, y) coordinate, an (x, y, z) coordinate, an (r, $\theta$) coordinate, an (r, $\theta$, $\phi$) coordinate, etc.) of presence-sensitive display 12 at or near which the object was detected. In another non-limiting example range, presence-sensitive display 12 may detect an object approximately six inches or less from the physical screen of the display. Other exemplary ranges may also be implemented in other examples.

Input device(s) 42, potentially including presence-sensitive display 12, is configured to receive user inputs. Input device 42, in some examples, is configured to receive input from a user through tactile, audio, or video feedback. Input device 42 may determine the location selected by the object (e.g., a user's finger or fingers) using capacitive, inductive, and/or optical recognition techniques. A "gesture input" may therefore in some examples refer to a proximate presence that is detected by an input device 42, or to a physical contact with input device 42, e.g., in the case of a touch-sensitive screen. Various examples may include different types of presence-sensitive display such as a device that detects gesture inputs by visual, acoustic, remote capacitance, or other type of signals, and which may also process user gesture inputs using pattern recognition software or other means to derive program inputs from user input signals.

Output device(s) 46 and may provide output using graphical, video, audio, or tactile outputs. In some examples, presence-sensitive display 12 may include functions and/or structures included in both input device(s) 42 and output device(s) 46. Output device 46, in some examples, is configured to provide output to a user using tactile, audio, or video stimuli. Output device 46, in one example, includes a presence-sensitive display, a sound card, a video graphics adapter card, or any other type of device for converting a signal into an appropriate form understandable to humans or machines. Additional examples of output device 46 include a speaker, a cathode ray tube (CRT) monitor, a liquid crystal display (LCD), or any other type of device that can generate intelligible output to a user.

Presence-sensitive display 12 or other input device(s) 42 may generate and provide signals based on user gesture inputs as data to graphical keyboard module 120 and/or morpheme-level word prediction module 122, and/or to one or more UI modules 126, application modules 14, or applications 185 loaded and/or executing on computing device 10 or components of computing device 10. One or more intermediary applications or operating system components of computing device 10 may also filter or process the signals generated via presence-sensitive display 12 before conveying filtered or processed input signals to graphical keyboard module 120 and/or morpheme-level word prediction module 122 or other modules, applications, or components of computing device 10.

Operating system 190 of computing device 10 may be stored on one or more storage devices 206 and executed by one or more processors 200. Operating system 190, in various examples, may control aspects of the operation of components of computing device 10, and facilitate operation of top-level software applications 185. Computing device 10, in this example, has applications 185 that may include graphical keyboard module 120 and/or morpheme-level word prediction module 122 that are executable by computing device 10. Applications 185 may also potentially include UI module(s) 126 or other application modules 14 as also depicted in FIG. 1, and/or language data 54. Graphical keyboard module 120, morpheme-level word prediction module 122, UI module(s)

126, language data 54, and/or other application modules 14 may include executable instructions and/or data to perform or facilitate any or all of the morpheme-level word prediction and other keyboard features and behavior discussed in this disclosure, or any other aspects of this disclosure. Operating system 190, in one example, may facilitate the interaction of graphical keyboard module 120 and/or morpheme-level word prediction module 122 with any or all of processors 200, network interface 204, data storage device 206, user interface devices 214 potentially including input devices 42, output devices 46, and/or presence-sensitive display 12, and/or other components of computing device 10.

Graphical keyboard module 120 and/or morpheme-level word prediction module 122 may include executable instructions to receive keyboard inputs and to generate text outputs based on the keyboard inputs. Graphical keyboard module 120 and/or morpheme-level word prediction module 122 may include executable instructions to respond to keyboard inputs by predicting and displaying morpheme-level predictions of candidate words or other candidate text strings at a text display GUI or a text input feature of an application, illustratively such as text input field 17 of GUI 11 as shown in FIG. 1. Graphical keyboard module 120 and/or morpheme-level word prediction module 122 may also include executable instructions to perform or facilitate any or all of the morpheme-level word prediction features or behavior discussed in this disclosure, or any other aspects of this disclosure.

Graphical keyboard module 120 and/or morpheme-level word prediction module 122 may each be an independent application, application process, service, or other software module. Graphical keyboard module 120 and/or morpheme-level word prediction module 122 may each collect or receive data or inputs from UI module(s) 126, language data 54, application modules 14, or other application modules or data stores, in some examples. Graphical keyboard module 120 and/or morpheme-level word prediction module 122 may also be portions of executable code within a single application, application process, service, or other software module, in some examples. Morpheme-level word prediction module 122 may also include an add-on that is integrated with graphical keyboard module 120 or one or more other application modules 14 of applications 185. Part or all of the functions of graphical keyboard module 120 and/or morpheme-level word prediction module 122 may also be performed, supported, or facilitated by portions of the operating system 190, as further described below.

Graphical keyboard module 120 and/or morpheme-level word prediction module 122 may include program instructions and/or data that are executable by computing device 10 or by at least one of the one or more processors 200 of computing device 10. For example, graphical keyboard module 120 and/or morpheme-level word prediction module 122 may include computer-executable software instructions that cause computing device 10 to perform any one or more of the operations and actions described in this disclosure. In various examples, graphical keyboard module 120, morpheme-level word prediction module 122, UI module(s) 126, language data 54, additional applications 14, and/or features of operating system 190 may include code and/or data that are stored on one or more data storage devices 206 and that are read and executed or processed by one or more processors 200, and that may in the process be stored at least temporarily in memory in one or more data storage devices 206.

Language data 54 may include data on vocabulary, spelling, grammar, morphemes, orthographic shifts, clitics, or any other data applicable to any one or more human natural languages. For example, language data 54 may include language data on English, French, Spanish, German, Japanese, Korean, Mandarin Chinese, Hindi, Urdu, Telugu, Swahili, or any other natural language. Language data 54 may include a language model built using pattern recognition processing techniques based on a large corpus or multiple corpora of language usage data. The language data 54 may include data on morpheme structure of multiple-morpheme words in the one or more applicable languages, such as grammatical and orthographic rules or patterns for how morphemes are assembled together in complete words in the given language. In some examples, language data 54 may also include language usage data accumulated from user inputs to graphical keyboard 13 that graphical keyboard modules 120 and/or morpheme-level word prediction modules 122 may use to customize word prediction outputs. In some examples, morpheme-level word prediction modules 122 and/or other modules may access language data 54 in a process of generating word predictions in response to user inputs to graphical keyboard 13, or in other aspects of this disclosure.

In the illustrative example of computing device 10 depicted in FIG. 2, operating system 190 may include an operating system kernel, which may include various kernel modules, kernel extensions, and device drivers, for example. Operating system 190 may also include or interact with a set of libraries 180, which may include various more or less standard, specialized, open source, and/or proprietary libraries. These may include a specialized library that may perform or support graphical keyboard functions and/or morpheme-level word prediction functions in accordance with any of the examples described herein, and that may form part or all of graphical keyboard module 120 and/or morpheme-level word prediction module 122, in some examples.

For purposes of example, portions or all of UI module(s) 126 may also be included as components of libraries 180. For example, UI module(s) 126 may include a graphical output surface manager library included in libraries 180 that receives outputs from multiple applications, application modules, operating system components, and/or other modules, and composes individual, unified graphical frames that combine graphical outputs corresponding to the outputs from the multiple modules. As another example, UI module(s) 126 may include a font manager library included in libraries 180 that processes the font, font size, and other graphical features of text outputs for rendering text outputs from various modules. UI module(s) 126 may include other libraries included in libraries 180, while one or more portions of UI module(s) 126 may also be included in other layers of operating system 190 or in top-level applications 185 in some examples.

In the illustrative example of computing device 10 depicted in FIG. 2, operating system 190 may also include or interact with a runtime environment ("runtime 194"). Runtime 194 may include various core libraries and/or one or more virtual machine implementations, in an example implementation. In this example, one or more virtual machines included in runtime 194 may abstract certain aspects and properties of computing device 10 and allow top-level applications 185 to execute in the environment of a virtual machine, so that software code in top-level applications 185 may be compiled into bytecode to be executed by the virtual machine. The virtual machine may then interpret the instructions for execution as native machine code of any one or more processors 200 of computing device 10, which may include optimizations specific to those processors 200, for example. Operating system 190 may also provide an operating environment for multiple virtual machines, and an individual operating system process and an individual virtual machine may be utilized for execution of each of one or more applications 185, in some examples.

In some examples, an application framework 130 may be provided for execution of applications on top of or otherwise in interaction with runtime 194 and libraries 180. Application framework 130 may include software, data, or other resources to facilitate the execution of top-level applications 185 that execute on top of application framework 130. Other embodiments may include other elements of a software stack within or between the operating system 190 and applications 185. Application framework 130 may, in some examples, include portions or all of graphical keyboard module 120 and/or morpheme-level word prediction module 122 that may include executable instructions to perform or facilitate any morpheme-level word prediction functions in a graphical keyboard, or any other aspects of this disclosure.

As shown, graphical keyboard functions and/or morpheme-level word prediction functions may be performed in the operating system 190 (e.g., via all or portions of graphical keyboard modules 120 and/or morpheme-level word prediction module 122 incorporated in operating system 190) and/or within top-level applications 185 (e.g., as all or portions of graphical keyboard module 120 and/or morpheme-level word prediction module 122 implemented as top-level applications). In some instances, performing or supporting graphical keyboard functions and/or morpheme-level word prediction functions in the operating system 190 rather than only within applications 185 may potentially enable keyboard input interactions, including morpheme-level word prediction, with faster or more computationally efficient performance, closer or more reliable integration with operating system 190 or other applications or functions executing on computing device 10, or other advantages. Computing device 10 may perform or facilitate any graphical keyboard functions described herein with all or portions of graphical keyboard module 120 and/or morpheme-level word prediction module 120 implemented in any part of a software arrangement on computing device 10, or with any other software component loaded on or operatively accessible to computing device 10.

In various examples, executable instructions for application modules or other software elements such as graphical keyboard module 120 and/or morpheme-level word prediction module 122 may be written in executable instructions that may be executable as native code by computing device 10. In some examples, executable instructions for applications or software elements such as graphical keyboard module 120 and/or morpheme-level word prediction module 122 may be written in a high-level programming language, then compiled to virtual-machine-executable bytecode to be executed by a virtual machine, ultimately to be executed as native code by computing device 10 under the abstraction of the virtual machine. In another illustrative example, executable instructions for applications or software elements such as graphical keyboard module 120 and/or morpheme-level word prediction module 122 may be compiled from a higher level language directly into native machine code for execution by one or more processors. In another illustrative example, libraries 180 may include a library that provides native support for functions in a given language, such as the C standard library (libc) or the standard Go library, for example. Graphical keyboard module 120 and/or morpheme-level word prediction module 122 may be written in that language (e.g., C, Go, etc.) and supported by that library included in libraries 180.

In different implementations, operating system 190 and/or a virtual machine included in runtime 194 may be able to execute code written in various languages such as C, Go, C++, JavaScript, Dart, Python, assembly language, or machine code, to name only a few non-limiting examples, either natively, or compiled into a virtual machine-executable bytecode or an intermediate language, or compiled into machine code or an assembly language native to one or more of the processors 200 of computing device 10, potentially using just-in-time (JIT) compilation, for example. Some examples may not use a virtual machine or an intermediate language, and may use applications that execute natively on the computing device 10 or that use some other compiler, interpreter, abstraction layer, or other means for interpreting a higher-level language into code that executes natively on computing device 10.

Any one or more of graphical keyboard module 120, morpheme-level word prediction module 122, libraries 180, or other aspect of operating system 190 or the software stack or middleware underlying the top-level applications 185 may include code for providing any or all of the functionality for performing morpheme-level word prediction for graphical keyboard inputs in accordance with any of the examples described herein, or any other aspect of this disclosure, and may abstract this functionality at an underlying level for applications 185. Executable instructions for implementing the functionality of any aspect of this disclosure may therefore be included in any level or portion of a software stack that executes on computing device 10. Executable instructions for implementing the functionality of any aspect of this disclosure may also include any software code operatively accessible to computing device 10, such as in a web application or other program executing on resources outside of computing device 10 but that interact with computing device 10, such as via Hypertext Transfer Protocol (HTTP) over a wireless connection, for example.

In various examples, operating system 190 and/or libraries 180 may include a set of application programming interfaces (APIs) for invocation by applications 185. These one or more APIs may include object libraries or other libraries, toolsets, or frameworks, and may be associated with a native programming environment for writing applications. Computing device 10 may also have a different specific organization of APIs, libraries, frameworks, runtime, and/or virtual machine associated with or executing on top of operating system 190 other than the example organization depicted in FIG. 2. Top-level applications 185 may therefore make use of any of various abstractions, properties, libraries, or lower-level functions that may be provided by any of operating system 190, an OS kernel included in operating system 190, libraries 180, runtime 194, core libraries or virtual machines included in runtime 194, application framework 130, portions of graphical keyboard module 120 and/or morpheme-level word prediction module 122 implemented in one or more components of operating system 190, or other compilers, interpreters, frameworks, APIs, data stores, files, or other types of resources, or any combination of the above, to enable aspects of this disclosure.

The one or more processors 200, in various examples, may be configured to implement functionality and/or to process instructions for execution within computing device 10. For example, processors 200 may be capable of processing instructions in a memory that may be part of data storage devices 206, or instructions that are otherwise stored on data storage devices 206. Computing device 10 may include multiple processors, and may divide certain tasks among different processors. For example, processors 200 may include a central processing unit (CPU), which may have one or more processing cores. Processors 200 may also include one or more graphics processing units (GPUs) and/or additional processors. Processors 200 may be configured for multi-threaded processing. Processors 200 and/or operating system 190 may divide tasks among different processors or processor cores according to various criteria, and various tasks or portions of tasks may also be divided among different layers of software and hardware.

Data storage devices 206, in various examples, may include memory configured to store information within computing device 10 during operation. Data storage devices 206, in various examples, may include memory in a computer-readable storage medium. In various examples, data storage devices 206 include a temporary memory, and computing device 10 may use one or more data storage devices 206 for either or both memory and long-term storage. Data storage devices 206, in various examples, may include a volatile memory, such that a memory included in one or more data storage devices 206 does not maintain stored contents for a long duration of time once it is powered down, such as when computing device 10 is turned off. Examples of volatile memories that may be included in one or more data storage devices 206 include random access memories (RAM), dynamic random access memories (DRAM), static random access memories (SRAM), and other forms of volatile memories. In various examples, one or more data storage devices 206 may be used to store program instructions for execution by processors 200. One or more data storage devices 206, in various examples, may be used by software or applications executing on computing device 10 to temporarily store data and/or software code during execution of an application.

One or more data storage devices 206, in various examples, may include a computer-readable storage medium or multiple computer-readable storage media. One or more data storage devices 206 may be configured to store larger amounts of information than may be stored in a memory of data storage devices 206. Data storage devices 206 may further be configured for long-term storage of information. In various examples, data storage devices 206 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories. In other examples, one or more of data storage devices 206 may also be configured for long-term data storage, and any of a variety of technologies may blur the lines between memory and data storage, or between volatile and non-volatile. One or more of data storage devices 206 may also include different levels of caches and any of various buffers or other temporary memories that may be incorporated at any of various levels of a processing architecture and with various latency and capacity profiles, including dedicated caches exclusive to specific processing cores or processing chips, for example.

Computing device 10, in various examples, may also include one or more communication units 242, such as a network interface 204. Computing device 10, in some examples, use network interface 204 to communicate with external devices, such as servers or data centers, via one or more networks, which may include one or more wireless networks. Network interface 204 may be or include a network interface card, such as an Ethernet card, an optical transceiver, a radio frequency transceiver, or any other type of component that is configured to send and receive information. Other examples of such network interfaces may include Bluetooth®, 3G, 4G, LTE, and WiFi® radios configured for mobile computing devices, as well as Universal Serial Bus (USB). In various examples, computing device 10 may use network interface 204 to communicate wirelessly with an external device such as a server, a data center, or an external service using multiple data centers, that may provide data to computing device 10.

Computing device 10 may also include or be configured to connect with any of a variety of user interface devices 214 or other input and/or output devices such as speakers, microphones, physical buttons, a virtual or physical keyboard or keypad, a mouse, a touchpad, a trackball, a voice user interface system, an acoustic vibration sensor, a sound card, a video graphics adapter card, or a video camera connected to a video gesture input interpretation system, for example. User interface devices 214 may also include any other type of device for detecting and/or interpreting inputs from a user or for converting a signal into a form of graphical, audio, tactile, or other form of user output that can be sensed by a user. These may be included in user interface devices 214 as part of computing device 10, and may also include separate and/or remote devices operatively connected to computing device 10.

Computing device 10, in various examples, may include one or more power sources 208, which may be rechargeable and provide power to computing device 10. Power source 208, in various examples, may be a lithium-ion battery, a nickel-cadmium battery, a nickel-metal hydride battery, or other suitable power source.

Computing device 10 is thus one illustrative example of a computing device to implement a graphical keyboard with morpheme-level word prediction features that may illustratively be implemented in the form of graphical keyboard module 120 and/or morpheme-level word prediction module 122 of FIG. 2, or other form of executable instructions stored on and/or executed by computing device 10, and as illustratively shown in operation in FIG. 1. Computing device 10 or other computing device implementations may have one or more applications or application components executing thereon that may implement any or all features of a graphical keyboard with morpheme-level word prediction features of this disclosure.

Figure 3:
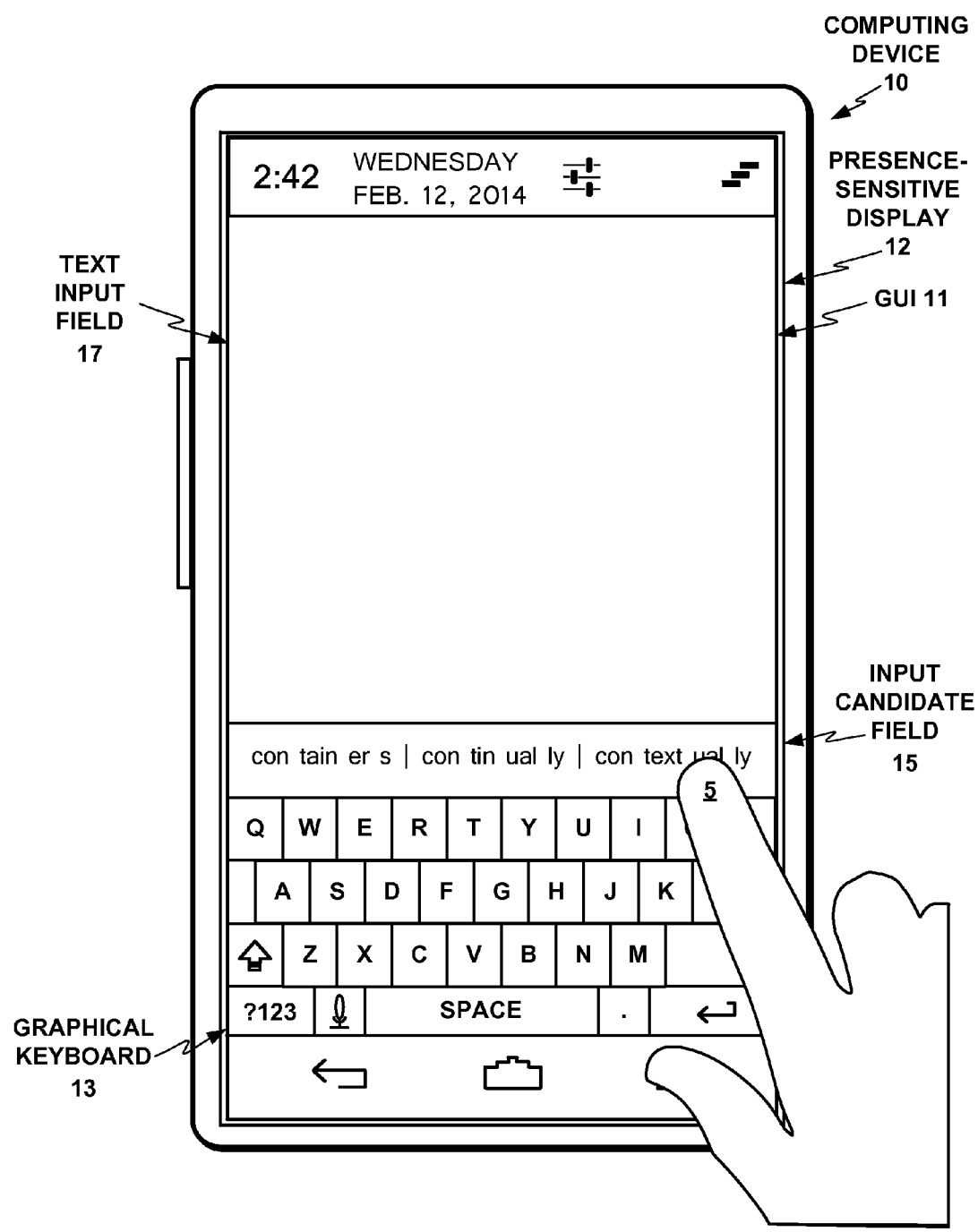
FIG. 3 is a top view diagram illustrating an example computing device configured to implement a graphical keyboard with additional morpheme-level word prediction features, in accordance with illustrative aspects of this disclosure.
Figure 4:
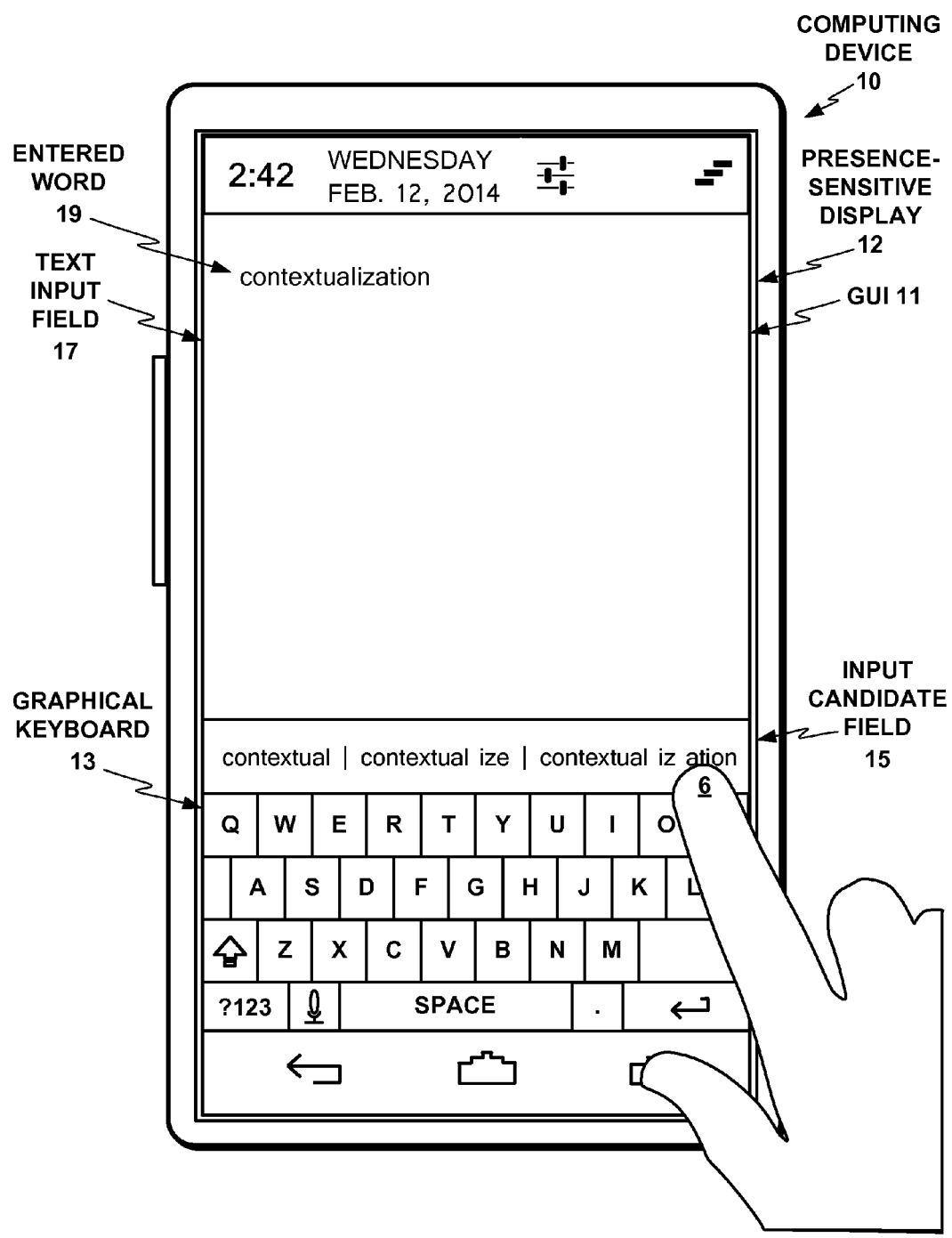
FIG. 4 is a top view diagram illustrating an example computing device configured to implement a graphical keyboard with additional morpheme-level word prediction features, in accordance with illustrative aspects of this disclosure.

FIG. 3 is a top view diagram illustrating an example computing device 10 configured to implement a graphical keyboard with morpheme-level word prediction features, in accordance with additional illustrative aspects of this disclosure. Computing device 10 outputs GUI 11 at presence-sensitive display 12, enabling a user to interact with a graphical keyboard 13, similarly to the features described above with reference to FIG. 1. The examples of FIGS. 3 and 4 may be different states in time for the same device in the example of FIG. 1, where the subject matter of FIGS. 3 and 4 is subsequent to that of FIG. 1 in a time sequence of outputs generated in response to received inputs. In the example of FIG. 3, computing device 10 still outputs the same candidate morpheme sequences in input candidate field 15 as in FIG. 1.

In FIG. 3, computing device 10 may receive input indicative of a gesture input to select one of the candidate morphemes from one of the candidate morpheme sequences displayed in input candidate field 15. In this example, computing device 10 may receive input indicative of a selection of one or more of the candidate morphemes from a candidate morpheme sequence that has four candidate morphemes, i.e., "con," "text," "ual," and "ly." In this example, the computing device 10 may receive input indicative of a selection of the third candidate morpheme, "ual," from this candidate morpheme sequence, as indicated in FIG. 3 by the user's touch or contactless indication at position 5, coinciding with the position of the candidate morpheme "ual." In particular, presence-sensitive display 12 may provide signals indicative of the user's gesture input at position 5 to one or more processors of computing device 10. The one or more processors of computing device 10 may, for example, perform filtering, processing, or other transformation of the user input indication signals before providing the indication of the user input to one or more elements of software involved in GUI and/or morpheme-level word prediction functions. Computing device 10 may thereby receive an indication of the user input detected at position 5 at presence-sensitive display 12.

That is, computing device 10 may determine, based on properties of the indication of the user input, that the user input coincided with position 5 and the candidate morpheme "ual" in GUI 11 as outputted at presence-sensitive display 12. Computing device 10 may thereby select the candidate morpheme "ual," as outputted at position 5, from its candidate morpheme sequence (i.e., "con," "text," "ual," "ly"). Computing device 10 may define the portion of this candidate morpheme sequence ending in the selected candidate morpheme "ual" as a selected morpheme sequence. That is, the selected candidate morpheme sequence includes the morphemes "con," "text," and "ual," the morphemes from the first morpheme in the candidate morpheme sequence through the selected morpheme. This selected candidate morpheme sequence omits the morphemes after the selected morpheme in the candidate morpheme sequence, in this case just one final morpheme, the morpheme "ly." In other examples, a selected morpheme may have more than one additional morphemes after the selected morpheme in a candidate morpheme sequence. In this case, the multiple additional morphemes after the selected morpheme are omitted from the selected morpheme sequence.

The selected morpheme sequence may therefore correspond to a morpheme sequence selected in accordance with a sequence of indications of user inputs, up to the current point in time. The candidate morpheme sequences displayed in input candidate field 15 as shown in FIG. 3 are based on indications of user inputs detected prior to the indication of the user input detected at position 5. Since the selected morpheme at position 5 is not a final morpheme of a word, computing device 10 may then remove the candidate morpheme sequences displayed in input candidate field 15 as shown in FIG. 3, and then output the selected morpheme sequence. Outputting the selected morpheme sequence may include outputting a single word, if the selected morpheme is a final morpheme of a word and the selected morpheme sequence corresponds to only one possible or known word in the applicable language. Computing device may output the single word in the input candidate field 15 and/or in the text input field 17, as a result of the determinations based on a sequence of indications of user inputs. If the selected morpheme is not a final morpheme of a word or corresponds to more than one possible or known word in the applicable language, outputting the selected morpheme sequence may include outputting multiple new candidate morpheme sequences for display in input candidate field 15, where each of the new candidate morpheme sequences begin with the selected morpheme sequence. An example of outputting multiple new candidate morpheme sequences for display in input candidate field 15 where each of the new candidate morpheme sequences begin with the selected morpheme sequence is shown in FIG. 4. Computing device 10 may iterate this process until a selected morpheme is a final morpheme of a word or corresponds to only one possible or known word in the applicable language.

FIG. 4 is a top view diagram illustrating an example computing device 10 configured to implement a graphical keyboard with additional morpheme-level word prediction features, in accordance with illustrative aspects of this disclosure. Computing device 10 outputs GUI 11 at presence-sensitive display 12, enabling a user to interact with a graphical keyboard 13, similarly to the features described above with reference to FIG. 3. As noted above, outputting the selected morpheme sequence after selecting the candidate morpheme at position 5 as shown in FIG. 3 may include outputting multiple new candidate morpheme sequences for display in input candidate field 15, where each of the new candidate morpheme sequences begins with the selected morpheme sequence(s). In this example, computing device 10 outputs the candidate morpheme sequence "contextual," the candidate morpheme sequence "contextual" "ize," and the candidate morpheme sequence "contextual" "iz" "ation," each of which begins with the previously selected morpheme sequence, "contextual."

Computing device 10 may then receive input indicative of a gesture input made in response to the new set of candidate morpheme sequences outputted at input candidate field 15. That is, computing device 10 may receive an indication of the user gesture input and determine that the user gesture input corresponds to position 6 and coincides with the position at which the final morpheme of the candidate morpheme sequence "contextualization" is displayed. Computing device 10 may determine that this candidate morpheme sequence is a newly selected morpheme sequence. Furthermore, since the selection corresponds to the final portion of a possible or known word in the applicable language and does not allow for other word options with further additional morphemes in the language model of the applicable language, computing device 10 may further determine that this newly selected morpheme sequence is also the selected word as the end result of the user text entry sequence. Computing device 10 therefore outputs the finalized word or entered word, i.e., the newly selected morpheme sequence "contextualization," in text input field 17 as entered word 19, as also shown in FIG. 4. Computing device 10 may therefore enter entered word 19 to text input field 17 and/or other field of text entry, such as for composition of a text message, an email message, or other text entry to an application running on computing device 10.

In other examples, computing device 10 may also account for orthographic differences in a language model when outputting new candidate morpheme sequences. For example, if an initial word portion is composed of the letters "happy," and the applicable language is English, computing device 10 may output candidate morpheme sequences for both "happy" and "happiness," where the letter "i" in "happiness" constitutes a minor orthographic shift from the letter "y" in "happy." Providing different candidate morpheme sequences flexibly across orthographic shifts such as spelling changes that don't reflect on language fundamentals may enable more accurate or more inclusive options for outputted candidate morpheme sequences.

As is shown in the sequence described above, computing device 10 determined a final entered word 19, "contextualization," based on only six user inputs. This is fewer user inputs than would be required for a user to enter the word "contextualization" by typing out every letter of the word "contextualization" on graphical keyboard 13. This is fewer user inputs than would be required for a user to enter the word "contextualization" by beginning to type the word "contextualization" and replying on a word-level predictive graphical keyboard, which would require the user to type out most of the entire word "contextualization" letter by letter before narrowing down the possibilities enough to output the word "contextualization" as a selectable option. A morpheme-level predictive graphical keyboard of this disclosure may therefore enable text entry of words with fewer user inputs, and may therefore also enable faster text entry.

A computing device may implement any or all of the morpheme-level word prediction features described with reference to FIGS. 1,3, and 4 and/or other morpheme-level word prediction features in execution of a graphical keyboard, and enable a user to use any one or more morpheme-level word prediction features. A computing device may enable one or more selected morpheme-level word prediction features by default, and may also enable one or more additional morpheme-level word prediction features to be activated optionally by a user.

Figure 5:
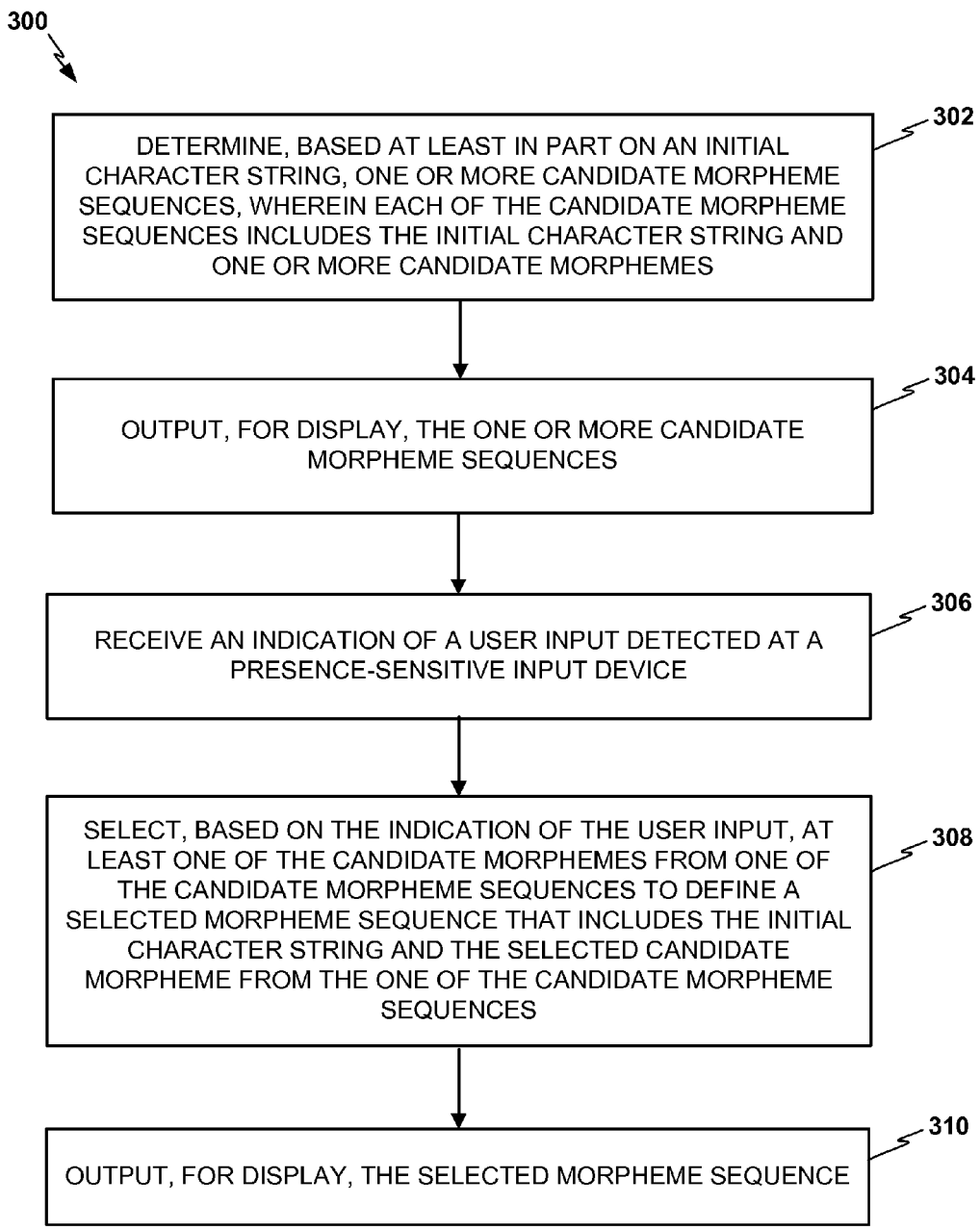
FIG. 5 is a flow diagram illustrating an example process that may be performed by or that may be embodied by a computing system to implement a graphical keyboard with morpheme-level word prediction features, in accordance with illustrative aspects of this disclosure.

FIG. 5 is a flow diagram illustrating an example process 300 or method that may be performed by or be embodied in a computing device, such as computing device 10 of FIGS. 1-4, or any one or more processors 200 of computing device 10 as shown in FIG. 2, for example, to implement morpheme-level word prediction features in accordance with aspects of this disclosure. Process 300 is only one example, and other implementations may include more or fewer elements or features than those depicted in FIG. 5. Process 300 is described below with reference to various features depicted and described with reference to any or all of FIGS. 1-4, such as one or more processor(s) 200 of FIG. 2, presence-sensitive display 12 of FIGS. 1-4, and/or graphical keyboard 13 of FIGS. 1,3, and 4, for example.

In process 300, a device such as computing device 10 or one or more processor(s) 200 thereof (for example) may execute instructions, such as executable instructions comprised in graphical keyboard module 120 and/or morpheme-level word prediction module 122 as described above. In the example of process 300, one or more processor(s) 200 may execute graphical keyboard module 120 and/or morpheme-level word prediction module 122 to perform or embody the functions described below. In various examples, a computing device of this disclosure that performs or embodies the functions described with reference to FIG. 5 may be a computer or mobile computing device such as a mobile phone (e.g., a smartphone) or tablet computer, or one or more individual processors, processing cores, or other sub-units of a larger computing device. Various examples of a computing device of this disclosure may be implemented as a device that includes a presence-sensitive display, or that is operatively coupled to an external display. In certain examples, the computing device may be a mobile computing device, such as a mobile phone (e.g., a smartphone) or tablet computer.

Prior to process 300 as shown in the example of FIG. 5, making reference to elements of the earlier figures, a computing device, such as computing device 10 or one or more processor(s) 200, may output, for display at a presence-sensitive display (e.g., presence-sensitive display 12), a graphical keyboard (e.g., graphical keyboard 13 in GUI 11) that includes a plurality of keys. The computing device may receive an indication of a first user input detected at the presence-sensitive display 12 (e.g., an indication of the one or more gesture inputs through the gesture indicating position 4, as described above with reference to FIG. 1). The computing device may select, based at least in part on the indication of the first user input, a sequence of keys from the plurality of keys. The computing device may determine, based at least in part on the sequence of keys, an initial character string (e.g., the character string forming the first four letters in each of the candidate words in input candidate field 15 as described above with reference to FIG. 1).

In the example of process 300 as shown in FIG. 5, the computing device may then determine, based at least in part on the initial character string, one or more candidate morpheme sequences, wherein each of the candidate morpheme sequences includes the initial character string and one or more candidate morphemes (e.g., the candidate morpheme sequences in input candidate field 15 as described above with reference to FIG. 1) (302). The computing device may output, for display (e.g., at presence-sensitive display 12 of FIGS. 1-4), the one or more candidate morpheme sequences (e.g., the candidate morpheme sequences outputted at input candidate field 15 as shown in FIG. 1) (304). The computing device may receive an indication of a user input (e.g., a second user input) detected at a presence-sensitive input device (e.g., the indication of the gesture input detected at a presence-sensitive display indicating position 5 as described above with reference to FIG. 3) (306).

The computing device may select, based on the indication of the user input (e.g., the second user input), at least one of the candidate morphemes from one of the candidate morpheme sequences (e.g., the candidate morpheme "ual" within the candidate morpheme sequence "con" "text" "ual" "ly", as described above with reference to FIG. 3) to define a selected morpheme sequence (e.g., the candidate morpheme sequence "con" "text" "ual") that includes the initial character string (e.g., "cont" as in FIG. 3) and the selected candidate morpheme (e.g., "ual" as in FIG. 3) from the one of the candidate morpheme sequences (e.g., from among all the candidate morpheme sequences outputted in input candidate field 15 as shown in FIG. 3) (308). The computing device may output, for display (e.g., at presence-sensitive display 12 of FIGS. 1-4), the selected morpheme sequence (e.g., several instances of the selected morpheme sequence "con" "text" "ual" in input candidate field 15 as shown in FIG. 4, both by itself as a complete word in which the selected candidate morpheme "ual" is the final morpheme, and as a portion of morpheme sequences in which the selected candidate morpheme "ual" is an intermediate morpheme of another, longer word, in which case the process may be reiterated) (310). The computing device, such as computing device 10 or one or more processor(s) 200, or other processors or devices, may further perform any of the functions and processes described above and below with reference to FIGS. 1-4 and 6.

Figure 6:
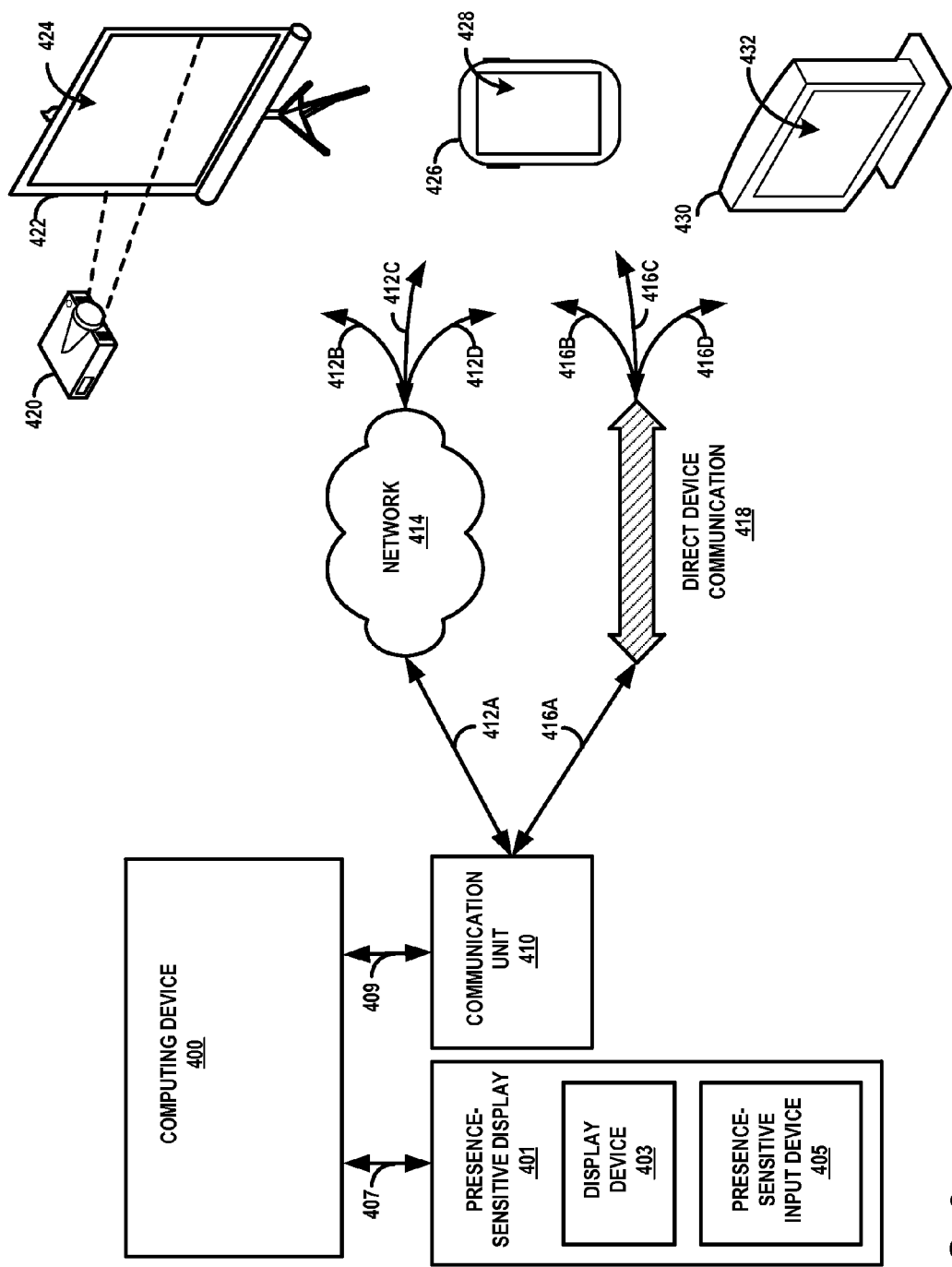
FIG. 6 is a block diagram illustrating an example computing device that outputs graphical content for display at a remote device, in accordance with illustrative aspects of this disclosure.

FIG. 6 is a block diagram illustrating another example computing device 400 that utilizes the techniques for providing morpheme-level word predictions described herein. In this example, computing device 400 outputs graphical content for display at a remote display device, in accordance with one or more techniques of the present disclosure. Graphical content, generally, may include any visual information that may be output for display, such as text, images, a sequence of moving images, etc. The example shown in FIG. 6 includes a computing device 400, presence-sensitive display 401, communication unit 410, projector 420, projector screen 422, tablet device 426, and visual display device 430. Computing device 400, projector 420, projector screen 422, tablet device 426, and/or visual display device 430 of FIG. 6 may be an implementation of computing device 10 of FIGS. 1-4. Although shown for purposes of example in FIGS. 1-4 as a stand-alone computing device 10, a computing device of this disclosure may generally be any component or system that is or that includes a processor or other suitable computing environment for executing software instructions. In some examples such as these, a computing device of this disclosure need not include a presence-sensitive display.

As shown in the example of FIG. 6, computing device 400 may be a processor or a set of processors (e.g., a multiple-core processor, a chipset, an arbitrarily distributed group of processors that are at least temporarily communicatively coupled, etc.) that includes functionality as described with respect to processor(s) 200 of FIG. 2. In such examples, computing device 400 may be operatively coupled to an input and/or output device such as presence-sensitive display 401 by a communication channel 407, which may be a system bus, communication fabric, or other suitable connection, from any proximate or remote location. Computing device 400 may also be operatively coupled to communication unit 410, further described below, by a communication channel 409, which may also be a system bus, communication fabric, or other suitable connection. Although shown separately as an example in FIG. 6, computing device 400 may be at least temporarily operatively coupled to presence-sensitive display 401 and communication unit 410 by any number of one or more communication channels.

In other examples, such as illustrated previously with computing device 10 in FIGS. 1-4, computing device 400 may be an integrated device or system that includes both one or more processors and an input and/or output device such as presence-sensitive display 401 as integrated or otherwise operatively coupled components of computing device 400. In examples such as these, one or more processors of computing device 400 may include functionality as described with respect to processor(s) 200 of FIG. 2, and may receive data from and send data to the presence-sensitive display component of computing device 400. In various examples, computing device 400 may be or include a portable or mobile device such as a mobile phone (e.g., a smartphone), a tablet computer, etc. In other examples, computing device 400 may be or include a laptop computer, a desktop computer, a smart television platform, a camera, a game console, a personal digital assistant (PDA), a mainframe, a data center, a real or virtual server, one or more devices executing a virtual server, etc. In other examples, computing device 400 may include both a local device containing both one or more processors and an input and/or output device (e.g., a presence-sensitive display), as well as one or more processors that are operatively connected to but separate or remote from the local device or the input and/or output device.

Presence-sensitive display 401, as shown in FIG. 6, may be an implementation of presence-sensitive display 12 as shown in FIGS. 1-4. Presence-sensitive display 401 may include display device 403 and presence-sensitive input device 405. Display device 403 may, for example, receive data encoding graphical content from computing device 400 and display the graphical content. In some examples, presence-sensitive input device 405 may determine one or more user inputs (e.g., continuous gestures, multi-touch or non-contact multi-indication gestures, single-touch or non-contact single-indication gestures, etc.) at presence-sensitive display 401. In some examples, presence-sensitive input device 405 may be physically positioned adjacent to (e.g., in a transparent overlay with) display device 403. As described above with reference to FIGS. 1 and 2, presence-sensitive input device 405 may be configured to detect touch gesture inputs and/or contactless gesture inputs by visual, infrared, acoustic, remote capacitance, or other type of signals, using capacitive, inductive, optical recognition, and/or other techniques. Presence-sensitive input device 405 may send indications of such contact or contactless user input gestures to computing device 400 using communication channel 407. When a user makes an input gesture indicating the position of a graphical element displayed by display device 403, presence-sensitive input device 405 may detect that the input gesture indicates (with or without contact) the location of display device 403 at which the graphical element is displayed.

As shown in FIG. 6, computing device 400 may also include and/or be operatively coupled with communication unit 410. Communication unit 410 may include functionality of communication unit(s) 242, including network interface 204, as described in reference to FIG. 2. Examples of communication unit 410 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 400 may also include and/or be operatively coupled with one or more other devices, e.g., input devices, output devices, memory, storage devices, etc. that are not shown in FIG. 6 for purposes of brevity and illustration.

FIG. 6 also illustrates a projector 420 and projector screen 422. Other such examples of projection devices may include electronic whiteboards, holographic display devices, wearable display devices, and any other suitable devices for displaying graphical content. Projector 420 and/or project screen 422 may include one or more communication units that enable the respective devices to communicate with computing device 400. In some examples, the one or more communication units may enable communication between projector 420 and projector screen 422. Projector 420 may receive data from computing device 400 that encodes graphical content. Projector 420, in response to receiving the data, may project the graphical content onto projector screen 422. In some examples, projector 420 may determine one or more user inputs (e.g., continuous gestures, multi-touch or non-contact multi-indication gestures, single-touch or non-contact single-indication gestures, etc.) at projector screen 422, or proximate to or within detection range of projector 420 or projector screen 422, using optical recognition or other suitable techniques. Projector 420 may then send indications of such user input using one or more communication units to computing device 400.

Projector screen 422, in some examples, may include a presence-sensitive display 424. Presence-sensitive display 424 may include a subset of functionality or all of the functionality of presence-sensitive display 12 as described in this disclosure. In some examples, presence-sensitive display 424 may include additional functionality. Projector screen 422 (e.g., an electronic whiteboard), may receive data encoding graphical content from computing device 400 and display the graphical content. In some examples, presence-sensitive display 424 may determine one or more user inputs (e.g., continuous gestures, multi-touch gestures, single-touch gestures, etc.) at, proximate to, or within detection range of projector screen 422 using capacitive, inductive, and/or optical recognition techniques. In some examples, projector screen 422 may then send indications of such user input using one or more communication units to computing device 400, either directly, or via projector 420.

FIG. 6 also illustrates tablet device 426 and visual display device 430. Tablet device 426 and visual display device 430 may each include computing and connectivity capabilities. Examples of tablet device 426 may include e-reader devices, convertible notebook devices, hybrid slate devices, etc. Examples of visual display device 430 may include televisions, computer monitors, etc. As shown in FIG. 6, tablet device 426 may include a presence-sensitive display 428. Visual display device 430 may include a presence-sensitive display 432. Presence-sensitive displays 428, 432 may include a subset of functionality or all of the functionality of presence-sensitive display 12 as described in this disclosure. In some examples, presence-sensitive displays 428, 432 may include additional functionality. Presence-sensitive display 432, for example, may receive data encoding graphical content from computing device 400 and display the graphical content. In some examples, presence-sensitive display 432 may determine one or more user inputs (e.g., continuous gestures, multi-touch or non-contact multi-indication gestures, single-touch or non-contact single-indication gestures, etc.) at, proximate to, or within detection range of projector screen using capacitive, inductive, and/or optical recognition techniques and send indications of such user input using one or more communication units to computing device 400.

As described above, in some examples, computing device 400 may output graphical content for display at presence-sensitive display 401 that is coupled to computing device 400 by a system bus or other suitable communication channel. Computing device 400 may also output graphical content for display at one or more remote devices, such as projector 420, projector screen 422, tablet device 426, and visual display device 430. For instance, computing device 400 may execute one or more instructions to generate and/or modify graphical content in accordance with techniques of the present disclosure. Computing device 400 may output the data that encodes the graphical content to a communication unit of computing device 400, such as communication unit 410. Communication unit 410 may send the data to one or more of the remote devices, such as projector 420, projector screen 422, tablet device 426, and/or visual display device 430. In this way, computing device 400 may output the graphical content for display at one or more of the remote devices. In some examples, one or more of the remote devices may output the graphical content at a presence-sensitive display that is included in and/or operatively coupled to the respective remote devices.

In some examples, computing device 400 may not output graphical content at presence-sensitive display 401 that is operatively coupled to computing device 400. In other examples, computing device 400 may output graphical content for display at both a presence-sensitive display 401 that is coupled to computing device 400 by communication channel 407, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 400 and output for display at presence-sensitive display 401 may be different than graphical content display output for display at one or more remote devices.

Computing device 400 may send and receive data using any suitable communication techniques. For example, computing device 400 may be operatively coupled to network 414 using network link 412A. Each of the remote devices illustrated in FIG. 6 may be operatively coupled to network 414 by one of respective network links 412B, 412C, and 412D. Network 414 may include network hubs, network switches, network routers, etc., that are operatively inter-coupled thereby providing for the exchange of information between computing device 400 and the remote devices illustrated in FIG. 6. In some examples, network links 412A-412D may include Ethernet, Asynchronous Transfer Mode (ATM), or other network connections. Such connections may include wireless and/or wired connections. Computing device 400 (e.g., all or a portion of a real or virtual server, a data center, etc.) may be operatively coupled to remote devices of FIG. 6, e.g., projector 420, projector screen 422, tablet device 426, and/or visual display device 430, via network 414 from any arbitrarily proximate or remote location.

In some examples, computing device 400 may be operatively coupled to one or more of the remote devices included in FIG. 6 using direct device communication 418. Direct device communication 418 may include communications through which computing device 400 sends and receives data directly with a remote device, using wired or wireless communication. That is, in some examples of direct device communication 418, data sent by computing device 400 may not be forwarded by one or more additional devices before being received at the remote device, and vice-versa. Examples of direct device communication 418 may include Bluetooth, Near-Field Communication (NFC), Universal Serial Bus (USB), Wi-Fi, Wi-Gig, infrared, etc. One or more of the remote devices illustrated in FIG. 6 may be operatively coupled with computing device 400 by communication links 416A-416D. In some examples, communication links 412A-412D may be connections using Bluetooth, NFC, USB, Wi-Fi, Wi-Gig, infrared, etc. Such connections may include wireless and/or wired connections.

In accordance with techniques of the disclosure, computing device 400 may be operatively coupled to projector 420, projector screen 422, tablet device 426, and/or visual display device 430 using network 414 and/or direct device communication 418. Computing device 400 may output a graphical user interface including various graphical content at presence-sensitive display 424 of projector screen 422, presence-sensitive display 428 of tablet device 426, and/or presence-sensitive display 432 of visual display device 430. Computing device 400 may send data implementing a graphical keyboard (e.g., graphical keyboard 13 as described above) enabled with morpheme-level word prediction techniques (such as those described above with reference to FIGS. 1-5) to be outputted at presence-sensitive display 424 of projector screen 422, presence-sensitive display 428 of tablet device 426, and/or presence-sensitive display 432 of visual display device 430 (collectively, "presence-sensitive displays 424, 428, 432"). Computing device 400 may send data implementing morpheme-level word prediction techniques for the graphical keyboard to be outputted at presence-sensitive displays 424, 428, and/or 432 based at least in part on receiving indications of user input gestures at presence-sensitive displays 424, 428, and/or 432, in accordance with one or more aspects of this disclosure. Presence-sensitive displays 424, 428, 432 are illustrative of any one or more presence-sensitive displays of any arbitrary number of any kind of devices that may be operatively coupled to computing device 400.

In these examples corresponding to FIG. 6, computing device 400 may receive an indication of a user input gesture detected at a presence-sensitive display (e.g., presence-sensitive displays 424, 428, and/or 432) operatively coupled to computing device 400, such that the user input gesture comprises a motion with respect to the presence-sensitive display. Presence-sensitive displays 424, 428, and/or 432 may be operatively coupled to computing device 400 via network 414 or via direct device communication 416, as described above. Projector 420, projector screen 422, tablet device 426, and/or visual display device 430 may transmit data that includes an indication of a user input gesture detected at presence-sensitive display 424, 428, and/or 432 via network 414 and/or direct communication device 418 to communication unit 410. Communication unit 410 may receive the data including the indication of the gesture, and communicate this data to computing device 400. In other examples, another presence-sensitive input device operatively coupled to computing device 400, such as presence-sensitive input device 405, may remotely detect a user input gesture of a user interacting with projector screen 422, tablet device 426, and/or visual display device 430. Presence-sensitive input device 405 may send data that includes an indication of a user input gesture detected at presence-sensitive input device 405 to computing device 400.

Computing device 400 may thus, via network 414 and/or direct device communication 418, receive data that includes indications of user input gestures detected at a presence-sensitive input device. Computing device 400 (e.g., computing device 10, or one or more processors forming part or all of computing device 10), executing a morpheme-level word prediction module (e.g., morpheme-level word prediction modules 122 described above with reference to FIGS. 1 and 2), may then select, based at least in part on the indication of a first user input to the presence-sensitive input device (e.g., presence-sensitive displays 424, 428, and/or 432), a sequence of keys from the plurality of keys. Computing device 400 may determine, based at least in part on the sequence of keys, an initial character string. Computing device 400 may determine, based at least in part on the initial character string, one or more candidate morpheme sequences, wherein each of the candidate morpheme sequences includes the initial character string and one or more candidate morphemes. Computing device 400 may output, for display at the presence-sensitive display (e.g., presence-sensitive displays 424, 428, and/or 432), the one or more candidate morpheme sequences. Computing device 400 may receive an indication of a second user input detected at the presence-sensitive display (e.g., presence-sensitive displays 424, 428, and/or 432). Computing device 400 may select, based on the indication of the second user input, one of the candidate morphemes from one of the candidate morpheme sequences, thereby defining a selected morpheme sequence that includes the initial character string and the selected candidate morpheme from the one of the candidate morpheme sequences. Computing device 400 may then output (e.g., by sending data via network 414 and/or direct device communication 418), for display at the presence-sensitive display (e.g., presence-sensitive displays 424, 428, and/or 432), the selected morpheme sequence.

Various techniques described herein may be implemented in hardware, firmware, or software that may be written in any of a variety of languages, making use of any of a variety of toolsets, frameworks, APIs, programming environments, virtual machines, libraries, and other computing resources, as indicated above. For example, software code may be written in C, Go, C++, JavaScript, Dart, Python, assembly language, machine code, or any other language. As one specific illustrative example, aspects of the disclosure discussed above may be implemented in a software module written in a selected programming language that is executable on one or more virtual machines.

Aspects of this disclosure may be equally applicable and implemented in any computing device or any operating system, and using any other APIs, frameworks, or toolsets. Aspects described herein for implementing a graphical keyboard with morpheme-level word prediction may interact with any other data store or application. When implemented in software or firmware, various techniques disclosed herein may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In various examples, an article of manufacture may comprise one or more computer-readable storage media.

In various examples, the data storage devices and/or memory may comprise computer-readable storage media that comprise non-transitory media. The term "non-transitory" indicates that the storage medium is not embodied in a carrier wave or a propagated signal. In certain examples, a non-transitory storage medium may store data that can, over time, change (e.g., in RAM or cache). Data storage devices may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format. In some examples, executable instructions may not be stored permanently in the local data storage comprised in a computing device and may be received temporarily from an external resource, such as from a web service, data center, and/or other server-side resource, yet those executable instructions may still be buffered, cached, or otherwise stored temporarily in a buffer memory, cache memory, processor registers, or other temporary memory comprised in the computing device. In these examples, the computing device may still comprise a computer-readable storage medium on which the executable instructions are stored, even if only temporarily.

Machine-readable code may be stored on the data storage devices and/or memory, and may include executable instructions that are executable by at least one processor. "Machine-readable code" and "executable instructions" may refer to any form of software code, including machine code, assembly instructions or assembly language, bytecode, software code in C, C++, Go, or software code written in any higher-level programming language that may be compiled or interpreted into executable instructions that may be executable by at least one processor, including software code written in languages that treat code as data to be processed, or that enable code to manipulate or generate code.

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

The various embodiments described above and depicted in FIGS. 1-6, as well as additional embodiments, are within the scope of one or more of the following claims.

What is claimed is:

1. A method comprising:
   determining, by a computing device and based at least in part on an initial character string, one or more candidate morpheme sequences, wherein each of the candidate morpheme sequences includes the initial character string and one or more candidate morphemes;

outputting, by the computing device and for display, the one or more candidate morpheme sequences;

receiving, by the computing device, an indication of a user input detected at a presence-sensitive input device;

selecting, by the computing device and based on the indication of the user input, at least one of the candidate morphemes from one of the candidate morpheme sequences to define a selected morpheme sequence, wherein the at least one of the candidate morphemes includes an orthographic modification at a morpheme boundary, and wherein the selected morpheme sequence includes the initial character string and the at least one of the candidate morphemes from the one of the candidate morpheme sequences; and outputting, by the computing device and for display, the selected morpheme sequence.

2. The method of claim 1, wherein the user input is a second user input, the method further comprising:

outputting, by the computing device and for display at a presence-sensitive display, a graphical user interface comprising a plurality of keys;

receiving, by the computing device, an indication of a first user input detected at the presence-sensitive display;

selecting, by the computing device and based at least in part on the indication of the first user input, a sequence of keys from the plurality of keys; and determining, by the computing device and based at least in part on the sequence of keys, the initial character string.

3. The method of claim 1, wherein an initial portion of the selected morpheme sequence comprises the initial character string, and a final portion of the selected morpheme sequence comprises the at least one of the candidate morphemes.

4. The method of claim 3, wherein the selected morpheme sequence further includes one or more intermediate morphemes between the initial character string and the at least one of the candidate morphemes.

5. The method of claim 3, further comprising:

determining, by the computing device, that the at least one of the candidate morphemes is a final morpheme of a complete word that includes the selected morpheme sequence, wherein outputting the selected morpheme sequence further comprises outputting the complete word at a text field of the graphical user interface.

6. The method of claim 5, wherein entering the selected morpheme sequence to the text field comprises outputting the complete word in a portion of a graphical user interface associated with the text field.

7. The method of claim 5, wherein the text field is associated with an application, and wherein entering the selected morpheme sequence to the text field comprises inputting the complete word to the application.

8. The method of claim 3, further comprising:

determining, by the computing device, that the at least one of the candidate morphemes is an intermediate morpheme of a complete word that includes the selected morpheme sequence; and determining, by the computing device, one or more extended candidate morpheme sequences, wherein each of the extended candidate morpheme sequences includes the at least one of the candidate morphemes, wherein outputting the selected morpheme sequence comprises outputting the one or more extended candidate morpheme sequences.

9. The method of claim 8, wherein the selected morpheme sequence is an initially selected morpheme sequence and wherein the user input is a second user input, the method further comprising:

receiving, by the computing device, an indication of a third user input detected at the presence-sensitive display;

selecting, by the computing device and based on the indication of the third user input, at least one new candidate morpheme from one of the extended candidate morpheme sequences, to define a selected extended morpheme sequence that includes the at least one new candidate morpheme and the initially selected morpheme sequence; and outputting, by the computing device and for display at the presence-sensitive display, the selected extended morpheme sequence.

10. The method of claim 9, further comprising:

determining, by the computing device, that the at least one new candidate morpheme is a final morpheme of a complete word that includes the selected extended morpheme sequence; and entering the complete word to a text field.

11. The method of claim 1, further comprising outputting, by the computing device, each of the candidate morpheme sequences with visual indicators of boundaries between adjacent morphemes in the candidate morpheme sequences.

12. The method of claim 11, wherein the visual indicators of the boundaries between adjacent morphemes comprise dividing lines between the adjacent morphemes.

13. The method of claim 11, wherein the visual indicators of the boundaries between adjacent morphemes comprise contrasting coloration of backgrounds of the adjacent morphemes.

14. The method of claim 11, wherein the visual indicators of the boundaries between adjacent morphemes comprise contrasting coloration of text of the adjacent morphemes.

15. The method of claim 11, wherein the visual indicators of the boundaries between adjacent morphemes comprise spacings between the adjacent morphemes.

16. The method of claim 1, wherein the orthographic modification comprises a spelling change.

17. The method of claim 1, wherein the orthographic modification comprises a change in hyphenation status.

18. The method of claim 1, further comprising outputting the selected morpheme sequence to a text field.

19. The method of claim 18, wherein the text field is associated with an application, and wherein outputting the selected morpheme sequence to the text field comprises inputting the selected morpheme sequence to the text field associated with the application.

20. The method of claim 18, wherein outputting the selected morpheme sequence to the text field comprises outputting the selected morpheme sequence at a portion of a graphical user interface associated with the text field.

21. The method of claim 1, wherein determining, by the computing device and based at least in part on the initial character string, the one or more candidate morpheme sequences, comprises processing the initial character string with reference to language data from a language model of one or more natural languages, wherein the language data comprises data on morpheme structure of multiple-morpheme words.

22. The method of claim 1, further comprising:

determining, by the computing device and based at least in part on language data from a language model of one or more natural languages, a probability ranking of the one or more candidate morpheme sequences, wherein outputting, by the computing device and for display, the one or more candidate morpheme sequences further comprises outputting the one or more candidate morpheme sequences in an order based at least in part on the probability ranking.

23. The method of claim 22, wherein determining the probability ranking of the one or more candidate morpheme sequences comprises applying an optimization algorithm to the candidate morpheme sequences to minimize user inputs in completing likely candidate words.

24. The method of claim 1, wherein outputting, by the computing device and for display, the one or more candidate morpheme sequences further comprises:
   outputting, by the computing device and for display, a selectable user interface element for accessing an expanded list of the candidate morpheme sequences; and
   outputting, by the computing device and for display, and in response to receiving an indication of a user input to select the selectable user interface element, the expanded list of the candidate morpheme sequences.

25. The method of claim 1, further comprising:
   detecting, by the presence-sensitive input device, the user input; and
   communicating, by the presence-sensitive input device to the computing device, the indication of the user input.

26. A computing device, comprising:
   at least one processor;
   wherein the at least one processor is configured to:
      determine, based at least in part on an initial character string, one or more candidate morpheme sequences, wherein each of the candidate morpheme sequences includes the initial character string and one or more candidate morphemes;
      output, for display, the one or more candidate morpheme sequences;
      receive an indication of a user input detected at a presence-sensitive input device;
      select, based on the indication of the user input, at least one of the candidate morphemes from one of the candidate morpheme sequences to define a selected morpheme sequence, wherein the at least one of the candidate morphemes includes an orthographic modification at a morpheme boundary, and wherein the selected morpheme sequence includes the initial character string and the at least one of the candidate morphemes from the one of the candidate morpheme sequences; and
      output, for display, the selected morpheme sequence.

27. A non-transitory computer-readable storage medium encoded with instructions executable by at least one processor to:
   determine, based at least in part on an initial character string, one or more candidate morpheme sequences, wherein each of the candidate morpheme sequences includes the initial character string and one or more candidate morphemes;
   output, for display, the one or more candidate morpheme sequences;
   receive an indication of a user input detected at a presence-sensitive input device;
   select, based on the indication of the user input, at least one of the candidate morphemes from one of the candidate morpheme sequences to define a selected morpheme sequence, wherein the at least one of the candidate morphemes includes an orthographic modification at a morpheme boundary, and wherein the selected morpheme sequence includes the initial character string and the at least one of the candidate morphemes from the one of the candidate morpheme sequences; and
   output, for display, the selected morpheme sequence.

\* \* \* \* \*